Patented Oct. 27, 1931

1,829,481

UNITED STATES PATENT OFFICE

IVAN GUBELMANN AND CLYDE O. HENKE, OF SOUTH MILWAUKEE, WISCONSIN, ASSIGNORS TO THE NEWPORT COMPANY, OF CARROLLVILLE, WISCONSIN, A CORPORATION OF DELAWARE

PROCESS FOR PREPARING AN ESTER

No Drawing. Application filed July 2, 1928. Serial No. 290,026.

This invention relates to a process of preparing ethyl abietate from rosin or abietic acid.

It is an object of this invention to provide a method of preparing ethyl abietate from abietic acid containing material and ethyl alcohol in a more economically practical manner than has hitherto been proposed.

Other and further important objects of this invention will become apparent from the following description and appended claims.

There have been methods described for preparing this ester employing absolute alcohol, abietic acid and concentrated sulfuric acid. The present invention employs an alcohol of weaker concentration than absolute alcohol, thus resulting in a more economical use of the raw material.

Our process employs ordinary grain alcohol of 95% strength, or a suitably denatured alcohol of similar strength, together with a condensing agent, as for example, concentrated sulfuric acid, oleum, hydrochloric acid and the like. The abietic acid containing material can be either a rosin or abietic acid in substantially pure form. The impure abietic acid as found in rosin tends to produce a poorer grade of ester.

Without limiting our invention to any particular procedure, the following example, in which parts by weight are given, will serve to illustrate our method in its preferred form.

*Example.*—To 2400 parts of 95% alcohol are added 360 parts of 25% oleum and 800 parts of abietic acid. This mixture is refluxed until about 90% of the abietic acid is esterfied. There is then added 3000 parts of water and the alcohol distilled off. The residue comprises ethyl abietate, about 10% of free abietic acid and dilute sulfuric acid. On standing, a layer of the ethyl abietate containing free abietic acid and a layer of dilute sulfuric acid are formed. The dilute sulfuric acid layer is separated from the ester layer and the latter washed practically free of sulfuric acid with water. The ethyl abietate is then fractionally vacuum distilled from the abietic acid giving a distillate of excellent quality of ethyl abietate. Instead of fractional distillation the calculated amount of alkali may be added and then the ethyl abietate distilled from the sodium abietate, which remains as a residue. If desired the sodium abietate may be removed from the ester in water solution, in which the ester is insoluble.

By this procedure about an 85% yield of ethyl abietate is secured and by reusing the abietic acid left in the fractionation still the yield may be brought up to over 95%.

Ethyl abietate has been produced from rosin in exactly the same way but the product contains some resene from the rosin, thereby making the product less pure than where abietic acid itself is used as starting material.

In carrying out the above process the ratio of reagents used may be varied within rather wide limits, and instead of employing 25% oleum, oleum of other strengths may be employed. Likewise, instead of oleum, concentrated sulfuric acid or hydrochloric acid may be used. The speed of the reaction may be increased by working at elevated temperatures under pressure. Moreover, in the esterification process the reaction may be stopped when more or less than 90% of the abietic acid is esterified. For example, the reaction may be stopped when 75 to 80% of the abietic acid has been esterified, the ester separated by fractional distillation from the abietic acid and the abietic acid again put in the process. The method of isolating the ester from the reaction mass may likewise be varied, as for example, after diluting the mass with water, the ester layer may be separated before distilling off the alcohol, washed and then fractionally distilled.

This invention involves the improvement in method of procedure which makes possible the use of 95% alcohol or an alcohol of weaker strength than absolute alcohol to perform the esterification.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing ethyl abietate, which comprises heating a commercial grade of ethyl alcohol of less strength than absolute with abietic acid containing material in the presence of a condensing agent to effect esterification and recovering the ethyl abietate.

2. The process of preparing ethyl abietate, which comprises heating ethyl alcohol of approximately 95% strength with abietic acid containing material in the presence of a condensing agent to effect esterification and recovering the ethyl abietate.

3. The process of preparing ethyl abietate, which comprises heating a commercial grade of ethyl alcohol of less strength than absolute with abietic acid containing material in the presence of concentrated sulfuric acid as condensing agent to effect esterification and recovering the ethyl abietate.

4. The process of preparing ethyl abietate, which comprises heating a commercial grade of ethyl alcohol of less strength than absolute with abietic acid in the presence of a condensing agent to effect esterification and recovering the ethyl abietate.

5. The process of preparing ethyl abietate, which comprises heating ethyl alcohol of approximately 95% strength with abietic acid in the presence of a condensing agent to effect esterification and recovering the ethyl abietate.

6. The process of preparing ethyl abietate, which comprises heating a commercial grade of ethyl alcohol of less strength than absolute with abietic acid in the presence of concentrated sulfuric acid as condensing agent to effect esterification and recovering the ethyl abietate.

7. The process of preparing ethyl abietate, which comprises subjecting approximately 95% ethyl alcohol and abietic acid to an elevated temperature in the presence of 25% oleum to effect esterification, diluting the reaction mass with water, separating the ethyl abietate from the diluted mass and fractionally distilling to obtain ethyl abietate in a high degree of purity.

8. The process of preparing ethyl abietate, which comprises refluxing a mixture of 95% ethyl alcohol, concentrated sulfuric acid and abietic acid to effect esterification, diluting the mass with water to form layers, separating one of said layers containing ethyl abietate and abietic acid and recovering the ethyl abietate.

9. The process of preparing ethyl abietate, which comprises refluxing a mixture of 95% ethyl alcohol, concentrated sulfuric acid and abietic acid to effect esterification, diluting the mass with water to form layers, separating one of said layers containing ethyl abietate and abietic acid and fractionally distilling in vacuo to recover the ethyl abietate.

10. In the process of preparing ethyl abietate by the esterification of ethyl alcohol and abietic acid in the presence of a condensing agent, the steps of stopping the reaction short of complete esterification, recovering abietic acid from the reaction mass and reusing said abietic acid in subsequent esterification operations.

11. In the process of preparing ethyl abietate by the esterification of ethyl alcohol and abietic acid in the presence of a condensing agent, the steps of stopping the reaction short of complete esterification, diluting the reaction mass to form a layer containing ethyl abietate and abietic acid, fractionally distilling the ethyl abietate layer in vacuo to separate the ethyl abietate from the abietic acid and reusing the abietic acid in further esterification operations.

12. The process of preparing ethyl abietate which comprises refluxing a mixture of 2400 parts of 95% ethyl alcohol, 800 parts of abietic acid and 360 parts of 25% oleum until about 90% of the abietic acid is esterified.

13. In the process of preparing ethyl abietate by heating abietic acid containing material with ethyl alcohol in the presence of a condensing agent, the improvement which comprises using ethyl alcohol of less strength than absolute.

In testimony whereof we have hereunto subscribed our names at Carrollville, Milwaukee County, Wis.

IVAN GUBELMANN.
CLYDE O. HENKE.